United States Patent
Yoo et al.

(10) Patent No.: US 8,004,586 B2
(45) Date of Patent: Aug. 23, 2011

(54) METHOD AND APPARATUS FOR REDUCING NOISE OF IMAGE SENSOR

(75) Inventors: Young-jin Yoo, Guri-si (KR); Ho-young Lee, Suwon-si (KR); Du-sik Park, Suwon-si (KR); Seong-deok Lee, Suwon-si (KR); Seung-sin Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 995 days.

(21) Appl. No.: 11/583,006

(22) Filed: Oct. 19, 2006

(65) Prior Publication Data

US 2007/0097236 A1    May 3, 2007

(30) Foreign Application Priority Data

Nov. 2, 2005  (KR) .......................... 10-2005-0104421

(51) Int. Cl.
*H04N 5/217*  (2006.01)
(52) U.S. Cl. ....................................................... 348/241
(58) Field of Classification Search .................. None
See application file for complete search history.

(56) References Cited

U.S. PATENT DOCUMENTS

| | | | | |
|---|---|---|---|---|
| 5,657,401 A * | 8/1997 | De Haan et al. | | 382/275 |
| 7,437,013 B2 * | 10/2008 | Anderson | | 382/261 |
| 2001/0033692 A1 * | 10/2001 | Borneo et al. | | 382/205 |
| 2001/0055428 A1 * | 12/2001 | Hayashi | | 382/274 |
| 2002/0180892 A1 * | 12/2002 | Cacciatore et al. | | 348/649 |
| 2003/0095206 A1 * | 5/2003 | Wredenhagen et al. | | 348/448 |
| 2004/0062449 A1 * | 4/2004 | Chiu | | 382/260 |
| 2006/0245666 A1 * | 11/2006 | Petrosyan et al. | | 382/275 |
| 2006/0262206 A1 * | 11/2006 | Lee et al. | | 348/241 |
| 2007/0071344 A1 * | 3/2007 | Ouzilevski et al. | | 382/254 |

FOREIGN PATENT DOCUMENTS

| | | |
|---|---|---|
| EP | 1126729 A1 | 8/2001 |
| JP | 2000-23173 A | 1/2000 |
| JP | 2003018432 A | 1/2003 |
| JP | 2005175718 | 6/2005 |
| KR | 10-2004-0062257 A | 7/2004 |

* cited by examiner

*Primary Examiner* — Lin Ye
*Assistant Examiner* — Euel K Cowan
(74) *Attorney, Agent, or Firm* — Sughrue Mion, PLLC

(57) ABSTRACT

An apparatus and a method for reducing noise from an image sensor are provided. The apparatus includes a noise-estimation unit which estimates a noise level representing an image frame expressed as a component in a color space, a filter-strength-calculation unit which determines filter strength based on the estimated noise level, and a filter-application unit which filters pixels constituting the image frame according to the determined filter strength.

35 Claims, 7 Drawing Sheets

METHOD AND APPARATUS FOR REDUCING NOISE OF IMAGE SENSOR

CROSS-REFERENCE TO RELATED APPLICATION

This application claims priority from Korean Patent Application No. 10-2005-0104421, filed on Nov. 2, 2005, the disclosure of which is incorporated herein in its entirety by reference.

BACKGROUND OF THE INVENTION

1. Field of the Invention

Apparatuses and methods consistent with the present invention relate to image-processing technology, and more particularly to reducing the noise of an image sensor.

2. Description of the Related Art

In recent years, with the rapid progress of digital camera technology, digital cameras supporting higher resolutions and various functions have been successively released. There are also many cases where such a digital camera is mounted in other portable appliances such as a cellular phone, a notebook computer, a personal data assistant (PDA) and so forth.

This digital camera is basically provided with an image sensor, such as a Charge Coupled Device (CCD), a Complementary Metal Oxide Semiconductor (CMOS) and the like, for collecting light from a subject and converting the collected light into electrical signals. However, at the present technology level, it is difficult to eradicate noise generation occurring when the image sensor photographs a subject. Therefore, most of the digital cameras have a function for removing or correcting noise, and such a function becomes more and more important in view of the current trend toward high quality images.

Numerous studies have recently been published in relation with noise reduction technology. Related art noise reduction technology includes a circuit-based technique in which high-frequency components are suppressed by passing image signals through a low-pass filter, a technique in which a spatial filter having a planarization function, such as a median filter, is applied to an image, and others. However, most of these techniques have a problem in that some improvement in subjective image quality is accompanied by an impairment of an original image's features, and the number of operations is too large to be suitable for appliances having limited resources, such as digital cameras.

SUMMARY OF THE INVENTION

Accordingly, an aspect of the present invention provides a method and an apparatus for adaptively correcting noise of input images, which is caused by noise characteristics and photography information in an image sensor.

A further aspect of the present invention provides a method and an apparatus for reducing noise of an image sensor, which are easy to implement in hardware because system complexity is low and the number of operations is small.

It should be noted that the present invention is not limited to those aspects previously mentioned, and other aspects not mentioned herein will be apparent to those skilled in the art from the following description.

In accordance with one aspect of the present invention, there is provided a noise-reduction apparatus including: a noise-estimation unit which estimates a noise level representing an image frame expressed as one component in a given color space; a filter-strength-calculation unit which determines filter strength based on the estimated noise level; and a filter-application unit which filters pixels constituting the image frame according to the determined filter strength.

In accordance with another aspect of the present invention, there is provided a noise reduction method including: estimating a noise level representing an image frame expressed as one component in a given color space; determining a filter strength based on the estimated noise level; and filtering pixels constituting the image frame according to the determined filter strength.

BRIEF DESCRIPTION OF THE DRAWINGS

The above and other features of the present invention will become apparent from the following detailed description taken in conjunction with the accompanying drawings, in which.

DETAILED DESCRIPTION OF THE EXEMPLARY EMBODIMENTS

Figure 1:
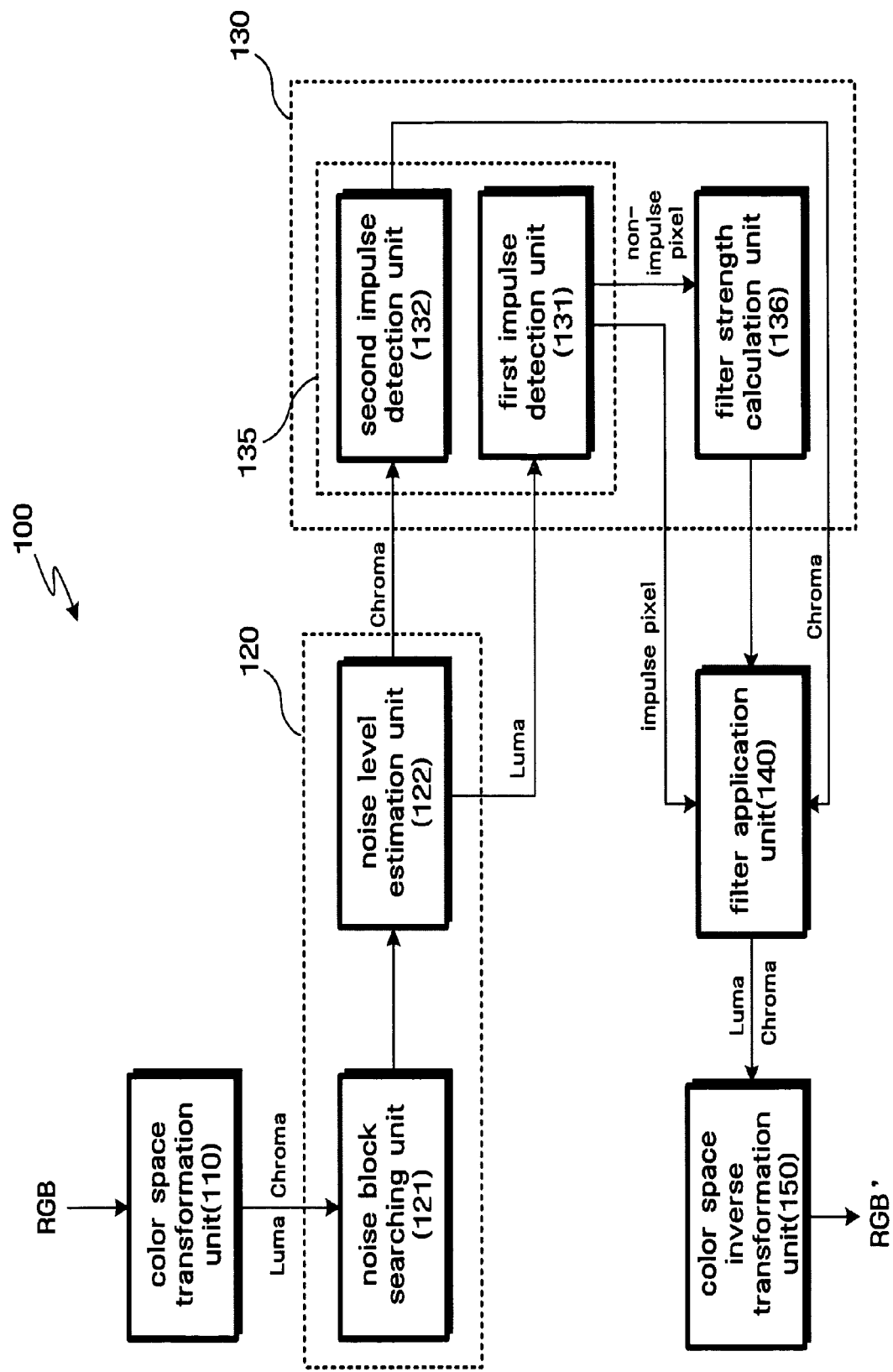
FIG. 1 is a block diagram illustrating a structure of an apparatus for reducing noise from an image sensor according to an exemplary embodiment of the present invention.

Aspects and features of the present invention will be apparent from exemplary embodiments described herein with reference to the accompanying drawings. However, the scope of the present invention is not limited to such exemplary embodiments and may be realized in various forms. The exemplary embodiments disclosed in the specification are merely examples provided to disclose the present invention and assist those skilled in the art to completely understand the present invention. The present invention is defined by the scope of the appended claims. Also, the same reference numerals are used to designate the same elements throughout the specification and drawings.

Hereinafter, exemplary embodiments of the present invention will be described in detail with reference to the accompanying drawings.

FIG. 1 is a block diagram illustrating a structure of an apparatus 100 for reducing noise from an image sensor according to an exemplary embodiment of the present invention. The image sensor includes a CCD, CMOS or other type of image sensor used in the art. The noise-reduction apparatus 100 may include a color-space-transformation unit 110, a noise-estimation unit 120, a feature-extraction unit 130, a filter-application unit 140 and a inverse-color-space-transformation unit 150.

The color-space-transformation unit 110 transforms components of an RGB color space (i.e., R, G and B components) into components of a luma-chroma color space. A typical model representing the luma-chroma color space includes YCbCr, YUV, YIQ and so forth. Luma and chroma have different characteristics, and are advantageous in that image processing is easy when an image is decomposed into luma and chroma. A relation for transforming the RGB model into another model is well known in the art, so a description thereof is omitted herein.

The noise-estimation unit 120 estimates a noise level (noise estimation value) capable of representing one image frame expressed by the luma-chroma color space. This noise level can be obtained for each of the luma and chroma components. To this end, the noise-estimation unit 120 includes a noise-block-searching unit 121 and a noise-level-estimation unit 122.

The noise-block-searching unit 121 calculates a Trimmed Sum of Absolute Difference (Trimmed SAD); (hereinafter referred to as "TSAD") in units of a given-sized mask included in a frame. The TSAD is calculated in such a manner that pixels of interest are set at equal intervals in transverse and longitudinal directions within a mask, and a sum of absolute differences between adjacent pixels among the set pixels of interest is obtained. When transverse and longitudinal intervals are all set to 1, all pixels within a mask may be pixels of interest. The transverse interval and the longitudinal interval can adaptively coincide with performances of appliances by setting them as parameters and making it possible for a user or a manufacturer to change the parameters. For example, the intervals are set to greater values in high-end appliances such as digital cameras, and are set to smaller values in low-end appliances such as computers.

Figure 2:
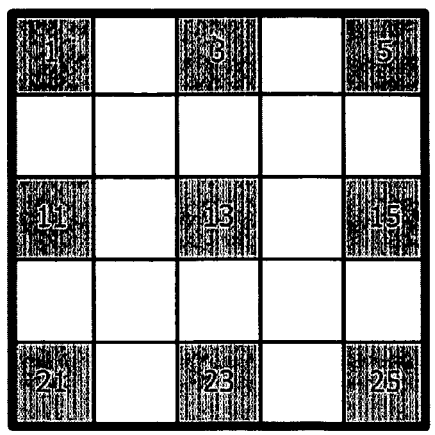
FIG. 2 is a view illustrating a mask configuration for a luma component.

In FIG. 2, pixels of interest are depicted with shaded boxes in the case where a mask has a size of 5×5, and transverse and longitudinal intervals are all set to 2. Numbers marked on the pixels of interest denote indexes corresponding to the respective pixels. When a luma component of a pixel corresponding to index i is $x_i$, $\xi_{local}$ representing a TSAD for the mask can be calculated by the equation:

$$\xi_{local} = \sum_{i=1}^{N} |x_i - x_{i+2}|, \text{ where } i \in \{1, 3, 5, 11, 13, 15, 21, 23\} \quad (1)$$

The TSAD is an indicator indicating how great a deviation between pixels is within the mask. A variance may be used, but even then the same result is obtained. However, variance calculation requires a large amount of operations as compared with the TSAD calculation, so it is difficult to apply the variance calculation to small-scale appliances such as a digital camera, a PDA, a cellular phone and the like.

For a chroma component, $\xi_{local}$ can be obtained mask by mask in the same manner as when the TSAD is obtained for the luma component. However, since the chroma component has a low-frequency characteristic, it is often accompanied with grain noise of great magnitude. Thus, it may be that the size of a mask is enlarged in comparison with that for the luma component. However, in view of the fact that most appliances use a line memory for processing an image, system resources are greatly consumed when the longitudinal size of a mask is enlarged as compared with when the transverse size of a mask is enlarged. Consequently, it is also possible to enlarge the transverse size of a mask and maintain the longitudinal size of a mask as compared with the luma component.

Figure 3:
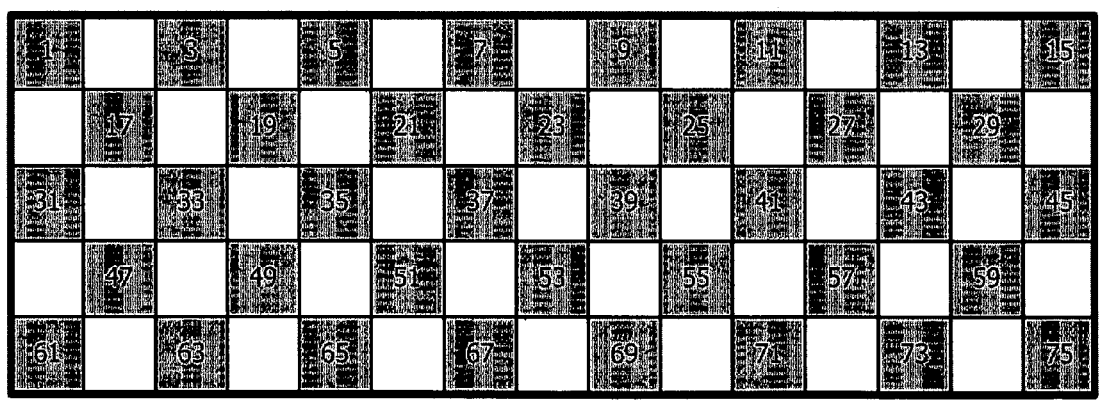
FIG. 3 is a view illustrating a mask configuration for a chroma component.

In FIG. 3, pixels of interest are depicted with shaded boxes in the case where a mask has a size of 5×15, and a transverse interval is set to 2 and a longitudinal interval is set to 1. The longitudinal size of the mask in FIG. 3 is the same as that in FIG. 2, but the number of the pixels of interest increases by reducing the longitudinal interval to 1. In appliances using a line memory, the amount of resources required for reading out the mask in FIG. 3 is the same as that required for reading out the mask in FIG. 2.

If the pixels of interest as illustrated in FIG. 3 are set, a TSAD ($\xi_{local}$) can be calculated mask by mask in the same manner as in Equation (1).

Figure 4:
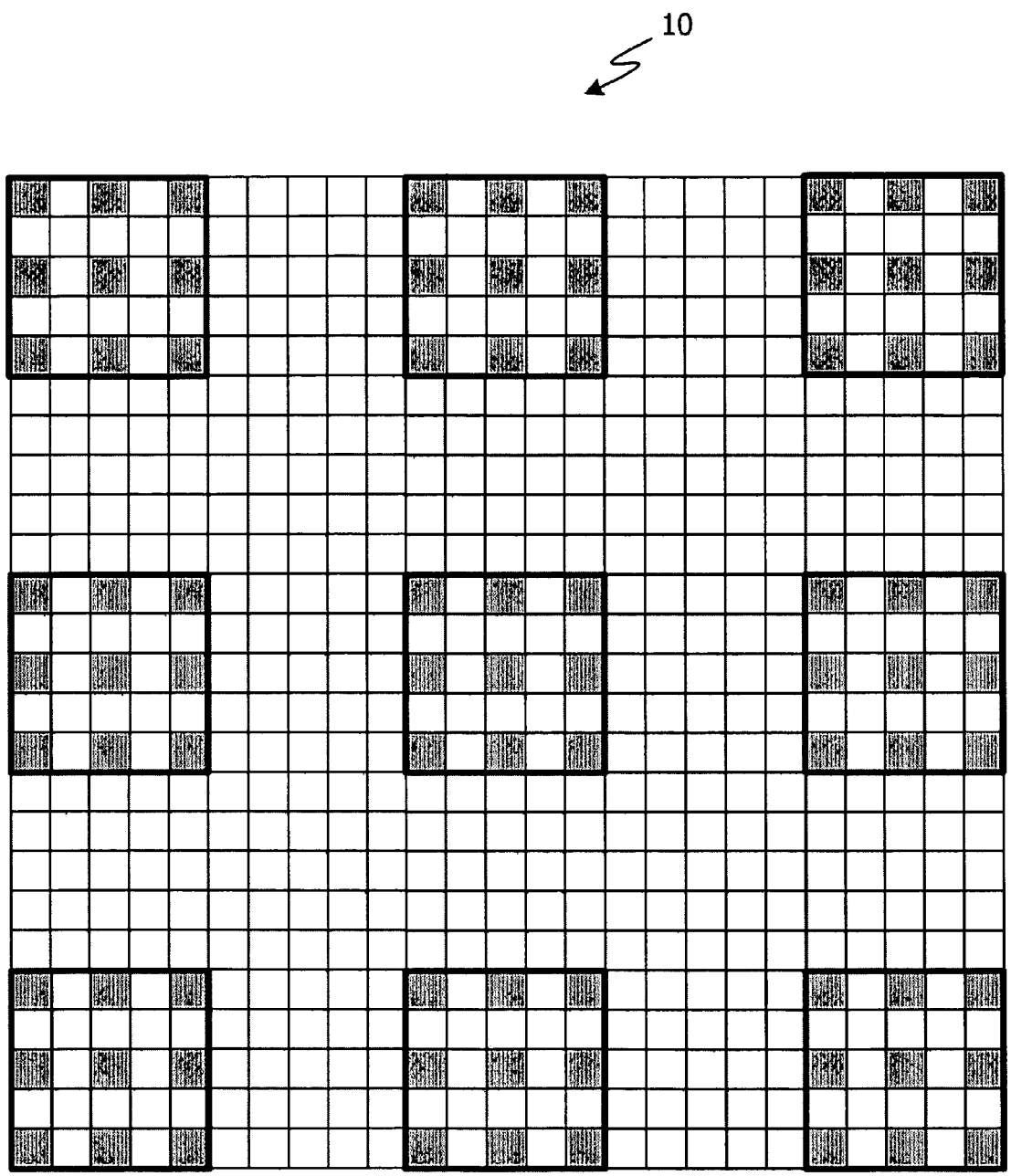
FIG. 4 is a view illustrating an example in which the mask in FIG. 2 is applied to the entirety of one frame.

Once the mask size and the pixels of interest as defined above are determined, they must be actually applied to the whole areas of the frame. FIG. 4 illustrates an example of applying the 5×5 mask shown in FIG. 2 to one frame 10. In FIG. 4, the mask is applied at a frequency (hereinafter referred to as "mask frequency") of 10 pixels in both the transverse and longitudinal directions. By performing a procedure of calculating the TSAD as in Equation (1) for all areas to which the mask is applied (hereinafter referred to as "mask areas"), the TSAD can be obtained mask by mask.

The mask frequency can also be adaptively selected according to performances of appliances. That is, high mask frequency is selected in high-performance appliances, and low mask frequency is selected in low-performance appliances.

Referring to FIG. 1 again, the noise-level-estimation unit 122 compares the TSAD, which has been calculated mask by mask, with a predetermined threshold value $T_{noise}$ to determine mask areas, which have a TSAD greater than the threshold value, as noisy areas. The noise-level-estimation unit 122 also calculates a representative value of the TSADs of the mask areas having been determined to be the noisy areas, that is, a noise estimation value for one frame. The noise estimation value can be obtained using various methods of calculating a mean, a median or other representative values of the TSADs of the mask areas having been determined to be the noisy areas.

The threshold value $T_{noise}$ can be obtained by the equation:

$$T_{noise} = AGC \times \omega_1 + \text{Exposure} \times \omega_2 + c, \quad (2)$$

where AGC denotes an Auto Gain Control value, and Exposure denotes an exposure value. AGC and Exposure can be easily found out by reading register values of a corresponding appliance. Also, $\omega_1$ and $\omega_2$ are weights for AGC and Exposure, respectively, and c is a constant. For example, $\omega_1$ may be set to 80/96, $\omega_2$ may be set to 20/1254, and c may be set to 20. The reason why $\omega_1$ is set to a relatively greater value than $\omega_2$ is that AGC has greater influence on noise occurrence than Exposure.

The noise-level-estimation unit 122 performs the above-mentioned procedure for the luma component, but need not necessarily pass through such a procedure for the chroma component. This is because the chroma component is less detailed than the luma component.

Accordingly, for the chroma component, a procedure of classifying the mask areas by comparing their TSADs with the threshold value $T_{noise}$ is omitted, a noise estimation value for the frame can be obtained in a manner of calculating a representative value for the overall TSADs that are calculated mask by mask in the noise-block-searching unit 121.

Next, using the noise estimation value v for one frame, which has been calculated in the noise-level-estimation unit 122, an impulse-detection unit 135 in the feature-extraction unit 130 detects impulse pixels existing within the frame. The impulse pixels refer to pixels having a greatly different pixel value from an actual pixel value, and generally appear in the form of scattered points.

The impulse-detection unit 135 may be subdivided into a first impulse-detection unit 131 detecting impulse pixels with respect to the luma component, and a second impulse-detection unit 132 detecting impulse pixels with respect to the chroma component.

Figure 5:
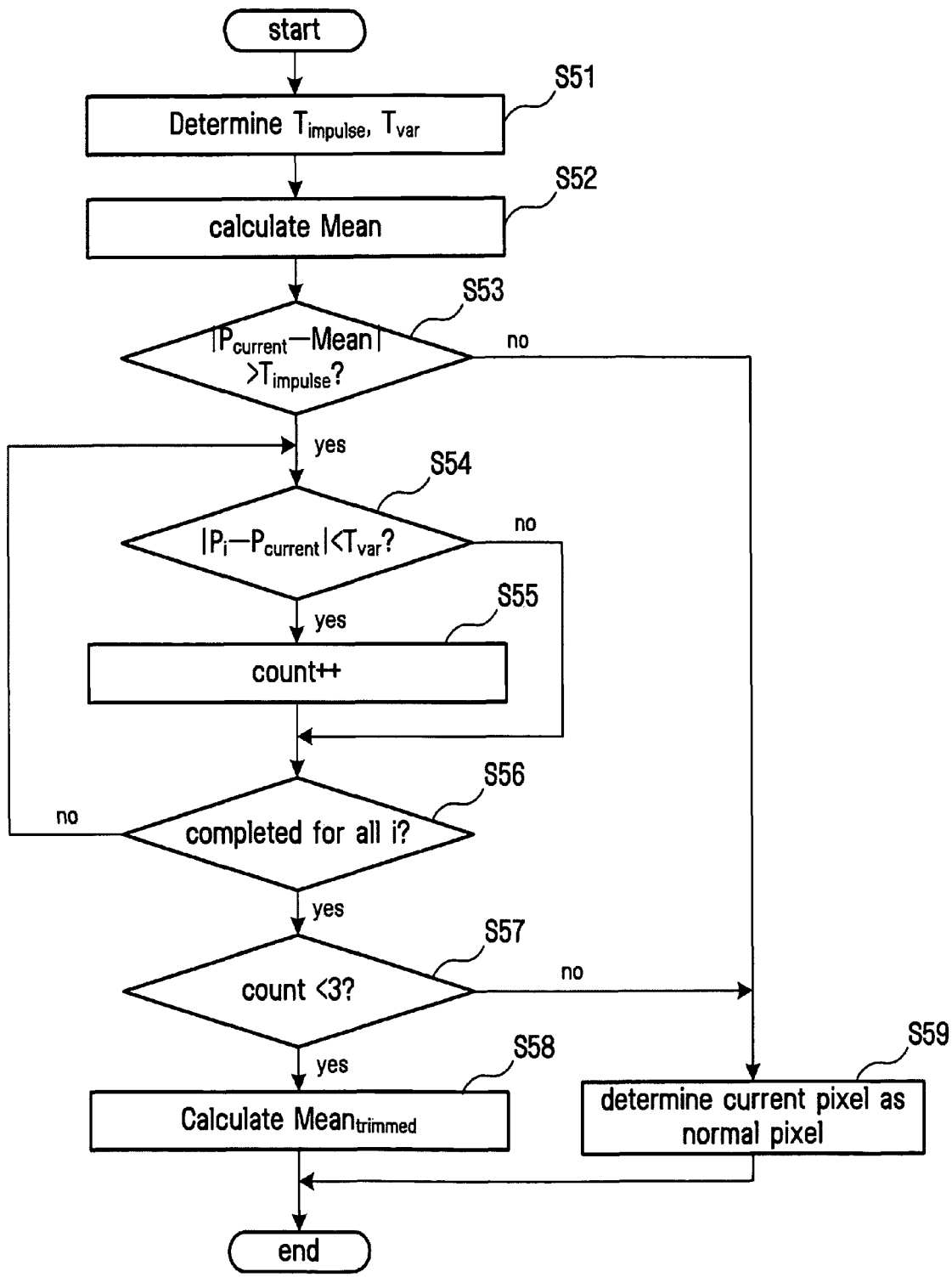
FIG. 5 is a flowchart illustrating an algorithm for detecting impulse pixels in a first impulse-detection unit.

FIG. 5 illustrates an algorithm for detecting impulse pixels in the first impulse-detection unit 131.

First, the first impulse-detection unit 131 determines an impulse threshold value $T_{impulse}$ S51. For example, the threshold value can be expressed as:

$$\text{if } T_{impulse} > a, \text{ then } T_{impulse} = a$$

$$\text{else, } T_{impulse} = v + b, \quad (3)$$

where a and b are constants, and v denotes a noise estimation value for a current frame. For example, a may be selected as 50, and b may be selected as 20.

Figure 6:
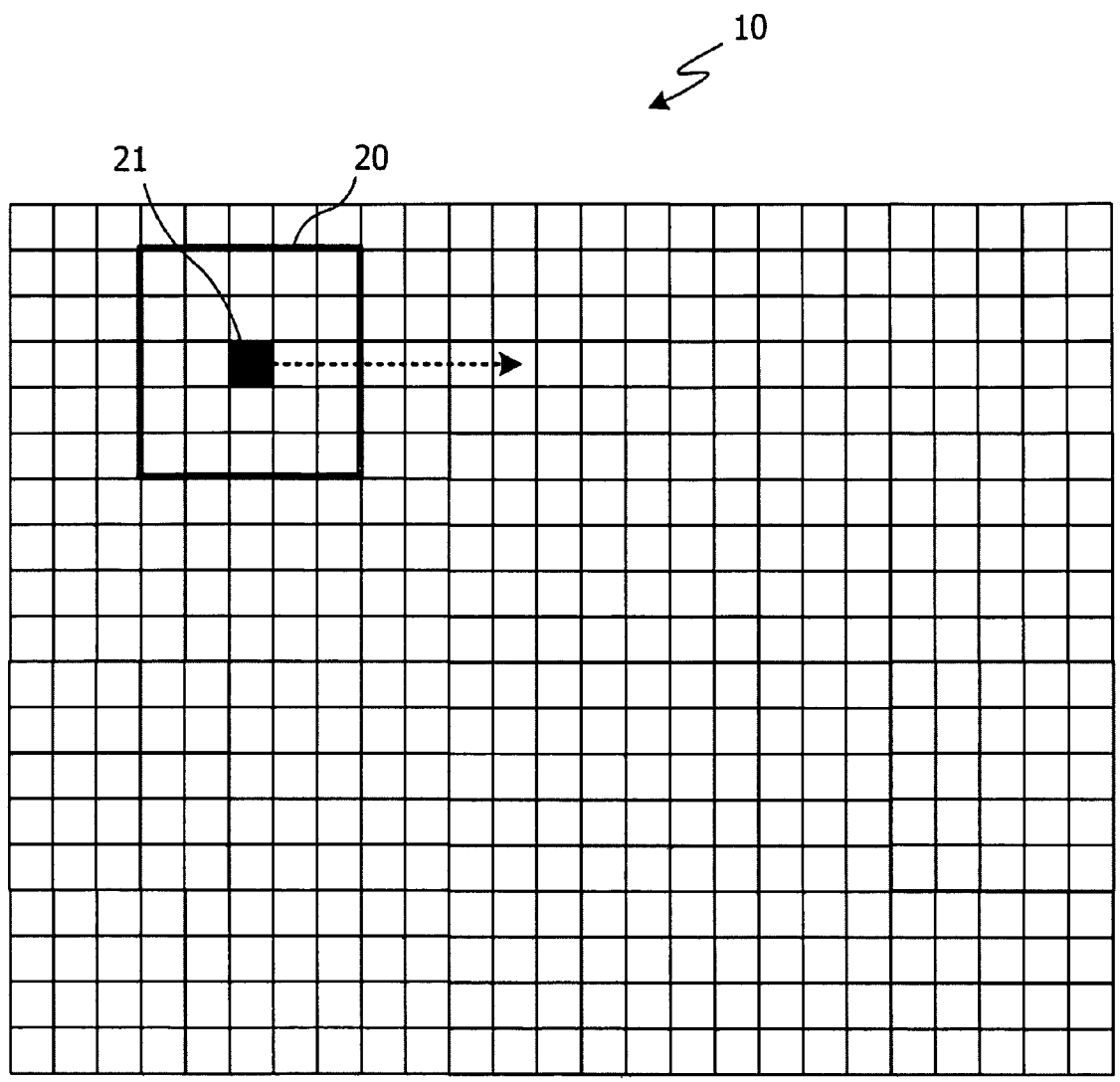
FIG. 6 is a view illustrating an example of a boundary block that is formed around a current pixel.

Next, the first impulse-detection unit 131 calculates a mean of pixel values within a given-sized boundary block around a current pixel S52. For example, when one pixel included in a current frame 10 as illustrated in FIG. 6 is assumed as a current pixel 21, a given-sized boundary block 20 can be established around the current pixel 21. The size of the boundary block 20 is preferably, but not necessarily the same as that of a mask used in the noise-block-searching unit 121. In FIG. 6, a boundary block having a size of 5×5 is established.

Next, the first impulse-detection unit 131 determines if a difference between the current pixel value and the mean exceeds $T_{impulse}$ S53. If a result of this determination shows that the difference does not exceed $T_{impulse}$, the current pixel is determined to be a normal pixel S59. However, if the result from step S53 shows that the difference exceeds $T_{impulse}$, then the first impulse-detection unit 131 determines if a difference between any pixel value $P_i$ within the boundary block 20 and the current pixel value $P_{current}$ is less than a given threshold value $T_{var}$ S54. For example, $T_{var}$ may be set to 30. If a result of this determination shows that the difference is not less than $T_{var}$, the first impulse-detection unit 131 goes directly to step S56, but if the difference is less than $T_{var}$, the first impulse-detection unit 131 increase a parameter of "count" by 1 S55, and then goes to step S56.

The first impulse-detection unit 131 repeatedly performs steps S54 and S55 for all pixels within the boundary block 20. Upon completion of repeatedly performing the steps for all the pixels within the boundary block 20 (yes in step S56), the first impulse-detection unit 131 determines if the cumulative count is less than 3 S57. If a result of this determination shows that the cumulative count is not less than 3, the current pixel is determined to be a normal pixel S59. This is because although the current pixel value is somewhat different from the mean, it is highly probable that the current pixel is not so much an impulse pixel as a pixel included in a high-frequency area such as a boundary portion of a texture when the cumulative count for the boundary block is not less than the given number (e.g., 3).

However, if the result from step S57 shows that the cumulative count is less than 3, the first impulse-detection unit 131 excludes the current pixel and the pixels satisfying the condition in step S54, and calculates a mean for the remaining pixels within the boundary block, that is, $Mean_{trimmed}$ S58. In this way, a procedure of determining if the current pixel is an impulse pixel is completed. Such a procedure is repeated until all pixels within the frame are subjected to the procedure, that is, until all the pixels are checked for being an impulse pixel. In FIG. 6, a pixel on the right side of the current pixel 21 may be a next current pixel, and thus the boundary block 20 moves right by one column.

The second impulse-detection unit 132 detects impulse pixels for the chroma component. The same algorithm as that performed in the first impulse-detection unit 131 may be used for the chroma component. However, considering the fact that the chroma component has grain noise of great magnitude due to its low-frequency characteristic, an algorithm in the second impulse-detection unit 132 must be somewhat different from that in the first impulse-detection unit 131.

Figure 7:
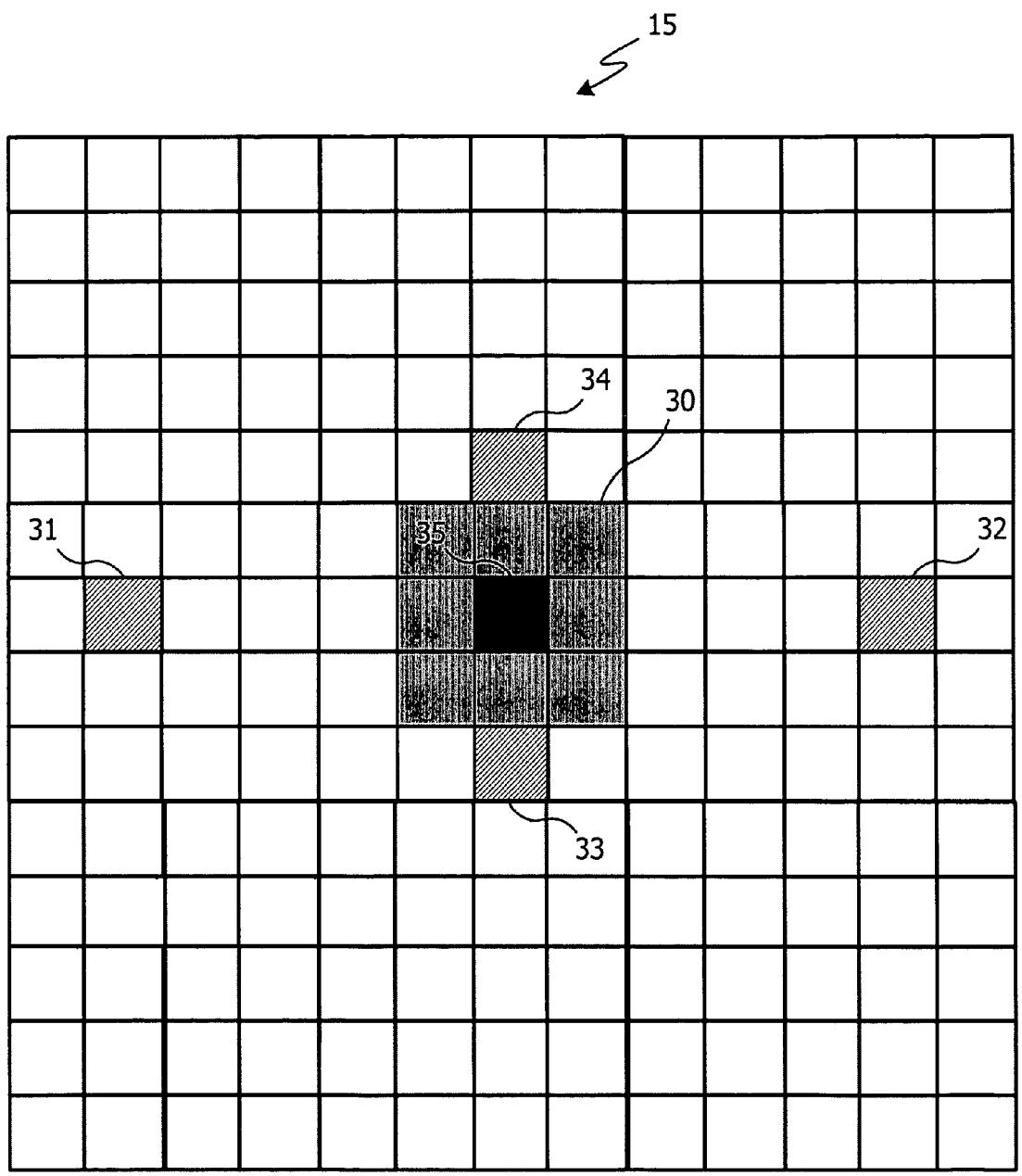
FIG. 7 is a view illustrating actual grain noise and a current pixel within a chroma frame.

FIG. 7 illustrates actual grain noise 30 and a current pixel 35 within a chroma frame 15. When whether or not the current pixel 35 in the chroma frame 15 is an impulse pixel is determined through comparison with adjacent pixels in the same manner as that for the luma component, there is a high probability that an error will occur. Thus, for the chroma component, it is rather effective to compare the current pixel 35 with pixels 31, 32, 33, 34 that are placed spatially apart from the current pixel 35 by some offset. At this time, if a transverse offset is designated by ϵ and a longitudinal offset is designated by λ (in FIG. 7, ϵ is set to 5, and λ is set to 2), the second impulse-detection unit 132 calculates a difference $D_1, D_2, D_3, D_4$ between the current pixel 35 and each of four pixels (hereinafter referred to as "reference pixels"), that is, two pixels 31, 32 placed away from the current pixel by ϵ and two pixels 33, 34 placed away from the current pixel by λ, and determines if each difference exceeds an impulse threshold value $T_{impulse}$. Dissimilar to the impulse threshold value used in the first impulse-detection unit 131, a fixed constant (e.g., 20) may be used as $T_{impulse}$ in the second impulse-detection unit 132.

The second impulse-detection unit 132 determines the current pixel 35 as a normal pixel if, from among $D_1, D_2, D_3$ and $D_4$, the number of those exceeding the impulse threshold value is greater than the given number, for example, 3. It doesn't matter if a condition where all of $D_1, D_2, D_3$ and $D_4$ exceed the impulse threshold value is adopted as a criterion for the determination. However, considering that at least one of the reference pixels may be contained in the grain noise 30, the given number is set to 3. Such a procedure of determining if the current pixel 35 is an impulse pixel is repeatedly performed for all pixels within the chroma frame.

A filter-strength-calculation unit 136 in the feature-extraction unit 130 determines filter strength γ for a pixel (non-impulse pixel) which is determined not to be an impulse pixel in the first impulse-detection unit 131. A mask is set around the non-impulse pixel, and a TSAD ($\xi_{local}$) is derived from pixels of interest within the mask. If $\xi_{local}$ is greater than $T_{noise}$, then the filter strength γ is determined to 1. $T_{noise}$ can be calculated from Equation (2).

Figure 8:
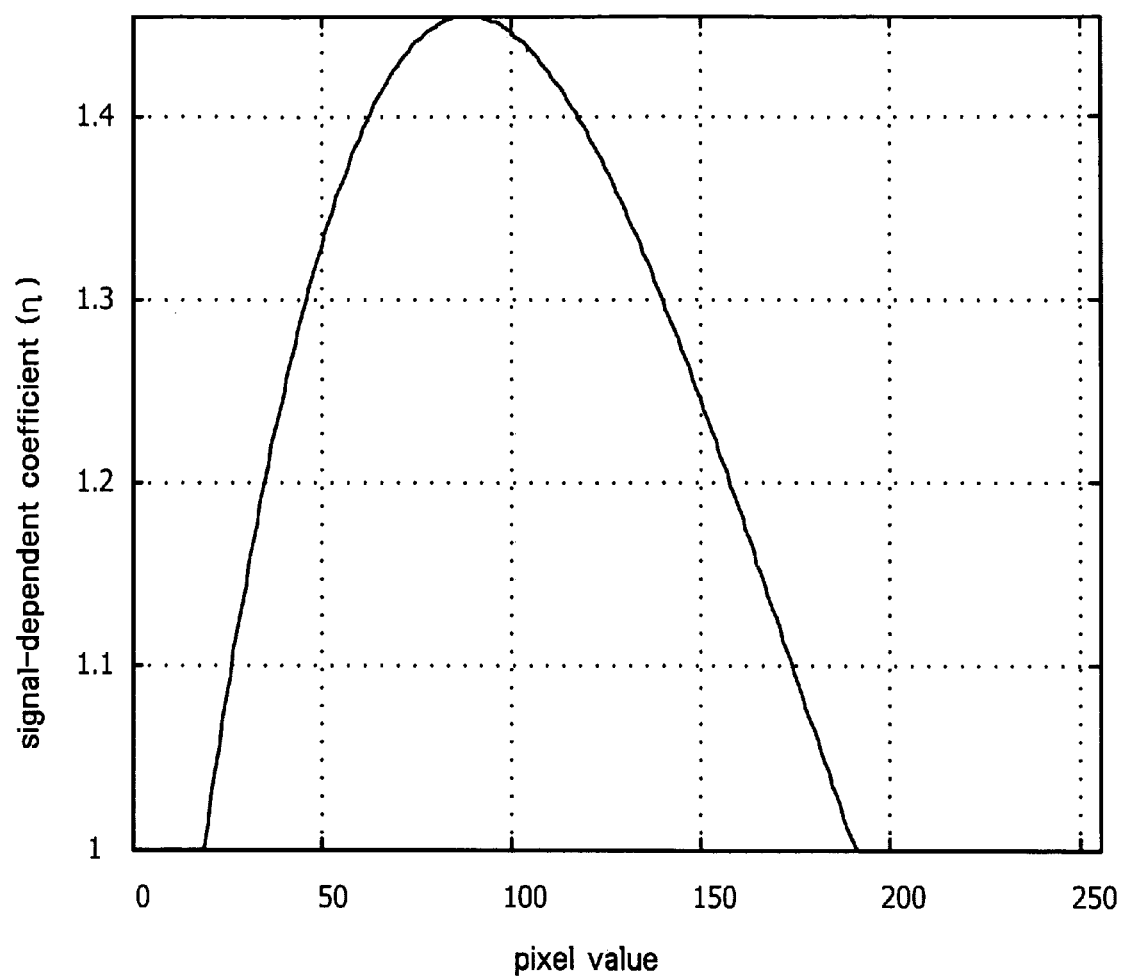
FIG. 8 is a graph illustrating a change of a signal-dependent coefficient over a pixel value ranging from 0 to 255.

Otherwise, the filter strength can be derived from:

$$\gamma = \frac{\xi_{local} - v \cdot \eta}{\xi_{local}} \quad \text{if } \xi_{local} - v \cdot \eta \geq 0 \quad (4)$$

$$\gamma = 0 \quad \text{if } \xi_{local} - v \cdot \eta < 0,$$

where v denotes a noise estimation value of the current pixel, and η denotes a signal-dependent coefficient. The signal-dependent coefficient is used in order to consider that the degree of noise may be different even in the same image according to the magnitude of a pixel value (brightness). FIG. 8 is a graph illustrating a change of a signal-dependent coefficient over a pixel value ranging from 0 to 255. It can be seen from the graph that the highest noise occurs at a pixel value of about 90. This graph can be obtained using a noise distribution appearing when a test chart having various pixel values is photographed.

The filter-application unit 140 applies a predetermined filter to a current pixel to replace the current pixel with a resultant filtered pixel, and provides the resultant filtered pixel to the inverse-color-space-transformation unit 150.

First, the filter-application unit applies the following filter rules to a luma pixel. When the luma pixels is not an impulse pixel, the filter-application unit 140 filters the luma pixel according to the equation:

$$y=\mu_{local}+\gamma(x-\mu_{local}), \quad (5)$$

where, x denotes a pixel before filtering, y denotes a pixel after filtering, and $\mu_{local}$ denotes a mean for all pixels within a mask established around x. Also, when the luma pixel is an impulse pixel, y is equal to $Mean_{trimmed}$ that is calculated in the first impulse-detection unit 131 (S58 in FIG. 5). In Equation 5, $\gamma$ is calculated in the filter-strength-calculation unit 136, and has a value of 0 to 1. In particular, y becomes equal to an input value x when $\gamma$ is 1, and becomes equal to $\mu_{local}$ when $\gamma$ is 0.

Next, the filter-application unit 140 applies the following filter rules to a chroma pixel. When the chroma pixel is not an impulse pixel, the filter-application unit 140 filters the chroma pixel according to the following equation:

if $|\xi_{local}-\nu|>\beta$, then y=x else, $y=\mu_{local}$, (6)

where $\mu_{local}$ denotes a TSAD which is calculated from pixels of interest within a mask set around x, and $\beta$ denotes a constant derived from a linear combination of AGC and Exposure. In this linear combination, weights for AGC and Exposure may be set to 80/96 and 20/1254, respectively.

Also, when the chroma pixel is an impulse pixel, y can be calculated by applying median operation for five pixels including the current chroma pixel and the four reference pixels as describe above with reference to FIG. 7.

The above-mentioned filter application procedure is repeatedly applied to all pixels constituting the current frame.

The inverse-color-space-transformation unit 150 transforms the respective pixels within the current frame, which are filtered by the filter-application unit 140, from the luma-chroma color space to the RGB color space. In this way, a RGB-transformed image may be displayed to a user by means of a display device, and others.

In the foregoing, the apparatus 100 for reducing noise from an image sensor according to an exemplary embodiment of the present invention has been described. However, the apparatus need not necessarily include the constituent elements illustrated in FIG. 1. For example, the operational procedure in the noise-estimation unit 120 may be substituted with a procedure of calculating a noise level base on AGC and Exposure. Also, the impulse-detection unit 135 functions to determine if a current pixel is an impulse pixel, but there is no problem in operating the filter-strength-calculation unit 136 and the filter-application unit 140 without determining if the current pixel is an impulse pixel. Thus, the impulse-detection unit 135 may be omitted.

Further, the color-space-transformation unit 110 and the inverse-color-space-transformation unit 150 may also be omitted. In this case, the above-mentioned noise reduction procedure for the luma component may be applied to each of RGB components.

Further, although the luma component and the chroma component have been described as being processed by different algorithms, respectively, they may also be processed by the same algorithm without departing from the spirit of the present invention. Moreover, it does not matter if the noise reduction procedure is applied to either the luma component only or the chroma component only. Further, the algorithms and functions used in the method and the apparatus disclosed herein may be embodied as a program capable of being executed via various computer units and may be recorded in a computer-readable recording medium.

A variety of logical blocks that have been illustratively described in connection with exemplary embodiments disclosed in the specification may be implemented or executed by means of a general-purpose processor, a Digital Signal processor (DSP), an Application Specific Integrated Circuit (ASIC), a Field Programmable Gate Array (FPGA) or any other programmable logical device, a discrete gate or transistor logical device, discrete hardware components, or any combination thereof. The general-purpose processor may be a microprocessor, but may also be any other conventional processor, controller, micro-controller, or state machine. Further, a processor may be implemented by means of a combination of computing devices, for example, a combination of a DSP and a microprocessor, a plurality of processors, at least one DSP core-related microprocessor, or any other allied configuration.

According to an exemplary embodiment the present invention described above, noise occurring in an image sensor, which is caused by noise characteristics and photography information, can be adaptively corrected according to input images.

Although exemplary embodiments of the present invention have been described for illustrative purposes, those skilled in the art will appreciate that various modifications, additions and substitutions are possible, without departing from the essential features and the scope and spirit of the invention as disclosed in the accompanying claims. Therefore, it should be appreciated that the exemplary embodiments described above are not limitative, but only illustrative.

What is claimed is:

1. An apparatus for reducing noise from an image sensor, the apparatus comprising:
    a noise-estimation unit which estimates a noise level representing an image frame expressed as a component in a color space;
    an impulse-detection unit detecting at least one pixel corresponding to an impulse pixel among pixels constituting the image frame using the estimated noise level;
    a filter-strength-calculation unit which determines filter strength based on whether a current pixel is the impulse pixel; and
    a filter-application unit which filters the pixels constituting the image frame according to the determined filter strength,
    wherein the first impulse-detection unit determines if a difference between a current luma pixel value and a mean pixel value within a boundary block of a size is greater than an impulse threshold value $T_{impulse}$, counts a number of cases where a difference between the current luma pixel and an adjacent pixel within the boundary block is less than a threshold value $T_{var}$ if the difference between the current luma pixel value and the mean pixel value is greater than the impulse threshold value $T_{impulse}$, and then determines the current luma pixel as an impulse pixel if the number is less than a given number.

2. The apparatus of claim 1, wherein the color space is selected from the group consisting of YCbCr, YUV and YIQ.

3. The apparatus of claim 2, wherein the component in the color space comprises a luma (Y) component.

4. The apparatus of claim 1, further comprising:
    a color-space-transformation unit which transforms input components of a RGB color space into components of the color space; and an inverse-color-space-transformation unit which transforms the resultant filtered pixels into components of the RGB color space.

5. The apparatus of claim 1, wherein the noise-estimation unit comprises: a noise-block-searching unit calculating a Trimmed SAD (Sum of Absolute Difference) in units of a mask, which has a frequency and size, for the image frame; and
a noise-level-estimation unit comparing the Trimmed SAD with a noise threshold value to obtain a representative value of the Trimmed SAD greater than the noise threshold value.

6. The apparatus of claim 5, wherein the noise threshold value is determined by a linear combination of Auto Gain Control (AGC) and an exposure value (Exposure).

7. The apparatus of claim 5, wherein the representative value comprises one of a mean and a median.

8. The apparatus of claim 1, wherein the impulse-detection unit comprises: a first impulse-detection unit which detects impulse pixels among luma pixels constituting the image frame; and
a second detection unit which detects impulse pixels among chroma pixels constituting the image frame.

9. An apparatus for reducing noise from an image sensor, the apparatus comprising:
a noise-estimation unit which estimates a noise level representing an image frame expressed as a component in a color space;
a filter-strength-calculation unit which determines filter strength based on the estimated noise level;
a filter-application unit which filters pixels constituting the image frame according to the determined filter strength; and
an impulse-detection unit detecting pixels corresponding to an impulse pixel among the pixels constituting the image frame, the impulse-detection unit comprises:
a first impulse-detection unit which detects impulse pixels among luma pixels constituting the image frame; and
a second detection unit which detects impulse pixels among chroma pixels constituting the image frame,
wherein the first impulse-detection unit determines if a difference between a current luma pixel value and a mean pixel value within a boundary block of a size is greater than an impulse threshold value $T_{impulse}$, counts a number of cases where a difference between the current luma pixel and an adjacent pixel within the boundary block is less than a threshold value $T_{var}$, if the difference between the current luma pixel value and the mean pixel value is greater than the impulse threshold value $T_{impluse}$, and then determines the current luma pixel as an impulse pixel if the number is less than a given number.

10. The apparatus of claim 9, wherein the $T_{impulse}$ is calculated as a sum of the noise level and a constant.

11. An apparatus for reducing noise from an image sensor, the apparatus comprising:
a noise-estimation unit which estimates a noise level representing an image frame expressed as a component in a color space;
a filter-strength-calculation unit which determines filter strength based on the estimated noise level;
a filter-application unit which filters pixels constituting the image frame according to the determined filter strength; and
an impulse-detection unit detecting pixels corresponding to an impulse pixel among the pixels constituting the image frame, the impulse-detection unit comprises:
a first impulse-detection unit which detects impulse pixels among luma pixels constituting the image frame; and
a second detection unit which detects impulse pixels among chroma pixels constituting the image frame,
wherein the second impulse-detection unit determines two reference pixels spatially away from a current chroma pixel by a transverse offset and another two reference pixels spatially away from the current chroma pixel by a longitudinal offset, calculates difference values between the current chroma pixel and the four reference pixels, respectively, and then determines the current chroma pixel as an impulse pixel if, among the difference values, a number of those greater than a threshold value exceeds a given number.

12. An apparatus for reducing noise from an image sensor, the apparatus comprising:
a noise-estimation unit which estimates a noise level representing an image frame expressed as a component in a color space;
a filter-strength-calculation unit which determines filter strength based on the estimated noise level; and
a filter-application unit which filters pixels constituting the image frame according to the determined filter strength,
wherein the filter-strength-calculation unit calculates filter strength y by a following equation, $$\gamma = \frac{\xi_{local} - v \cdot \eta}{\xi_{local}},$$

where $\xi_{local}$ and $\eta$ denote a Trimmed SAD, a noise level and a signal-dependent coefficient for a mask, respectively.

13. An apparatus for reducing noise from an image sensor, the apparatus comprising:
a noise-estimation unit which estimates a noise level representing an image frame expressed as a component in a color space;
a filter-strength-calculation unit which determines filter strength based on the estimated noise level; and
a filter-application unit which filters pixels constituting the image frame according to the determined filter strength,
wherein if the component comprises a luma component, the filter-application unit derives a value of a pixel after filtering, y, from a value of a pixel before filtering, x, using the equation:

$$y = \mu_{local} + \gamma(x - \mu_{local}),$$

where $\mu_{local}$ denotes a mean for all pixels within a mask established around x, and y denotes the determined filter strength.

14. The apparatus of claim 13, wherein if the pixel after filtering is an impulse pixel, y is determined to be $Mean_{rimmed}$.

15. The apparatus of claim 13,
wherein if the component is a chroma component, the filter-application unit omits filtering if a difference between the noise level and a Trimmed SAD of the mask is greater than a constant, and determines a value of a pixel after filtering, y, as μlocal only if the difference is not greater than the constant.

16. The apparatus of claim 15, wherein if the pixel after filtering is an impulse pixel, the filter-application unit determines two reference pixels spatially away from a current chroma pixel by a transverse offset and another two reference pixels spatially away from the current chroma pixel by a longitudinal offset, and then determines a median for the four reference pixels and the current chroma pixel as y.

17. The apparatus of claim 1, wherein the image sensor comprises one of a Charge Coupled Device (CCD) and a Complementary Metal Oxide Semiconductor (CMOS).

18. A method of reducing noise of an image sensor, the method comprising:
(a) estimating a noise level representing an image frame expressed as a component in a color space;
(b) detecting pixels corresponding to an impulse pixel, from among pixels constituting the image frame using the estimated noise level;
(c) determining filter strength based on whether a current pixel is the impulse pixel; and
(d) filtering the pixels constituting the image frame according to the determined filter strength,
wherein the first impulse-detection unit determines if a difference between a current luma pixel value and a mean pixel value within a boundary block of a size is greater than an impulse threshold value $T_{impulse}$, counts a number of cases where a difference between the current luma pixel and an adjacent pixel within the boundary block is less than a threshold value $T_{var}$ if the difference between the current luma pixel value and the mean pixel value is greater than the impulse threshold value $T_{impulse}$, and then determines the current luma pixel as an impulse pixel if the number is less than a given number.

19. The method of claim 18, wherein the color space is selected from the group consisting of YCbCr, YUV and YIQ.

20. The method of claim 19, wherein the component in the color space comprises a luma (Y) component.

21. The method of claim 18, further comprising:
(e) transforming input components of a RGB color space into components of the color space; and
(f) transforming the resultant filtered pixels into components of the RGB color space.

22. The method of claim 18, wherein (a) comprises: (a1) calculating a Sum of Absolute Difference (Trimmed SAD) in units of a mask, which has a frequency and size, for the image frame; and
(a2) comparing the Trimmed SAD with a noise threshold value to obtain a representative value of the Trimmed SAD greater than the noise threshold value.

23. The method of claim 22, wherein the noise threshold value is determined by a linear combination of Auto Gain Control (AGC) and an exposure value (Exposure).

24. The method of claim 22, wherein the representative value comprises one of a mean and a median.

25. The method of claim 18, wherein (b) comprises: (b1) detecting impulse pixels from among luma pixels constituting the image frame; and
(b2) detecting impulse pixels from among chroma pixels constituting the image frame.

26. The method of claim 25, wherein (b1) comprises: determining if a difference between a current luma pixel value and a mean pixel value within a boundary block of a size is greater than an impulse threshold value $T_{impulse}$;
if the difference between the current luma pixel value and the mean pixel value is greater than the impulse threshold value $T_{impulse}$, counting a number of cases where a difference between the current luma pixel and an adjacent pixel within the boundary block is less than a threshold value $T_{var}$; and
if the number is less than the given number, determining the current luma pixel as an impulse pixel.

27. The method of claim 26, wherein the $T_{impulse}$ is calculated as a sum of the noise level and a constant.

28. The method of claim 25, wherein (b2) comprises: determining two reference pixels spatially away from a current chroma pixel by a transverse offset and another two reference pixels spatially away from the current chroma pixel by a longitudinal offset;
calculating difference values between the current chroma pixel and the four reference pixels, respectively; and
if, from among the difference values, the number of those greater than a threshold value exceeds the number, determining the current chroma pixel as an impulse pixel.

29. The method of claim 18, wherein (c) involves calculating the filter strength γ using the equation:

$$\gamma = \frac{\xi_{local} - \nu \cdot \eta}{\xi_{local}},$$

where $\xi_{local}$ and η denote a Trimmed SAD, a noise level and a signal-dependent coefficient for a mask, respectively.

30. The method of claim 18, wherein if the component is a luma component, (d) comprises deriving a value of a pixel after filtering, y, from a value of a pixel before filtering, x, using the equation:

$$y = \mu_{local} + \gamma(x - \mu_{local}),$$

where $\mu_{local}$ denotes a mean for the whole pixels within a mask established around x, and γ denotes the determined filter strength.

31. The method of claim 30, wherein if the pixel after filtering is an impulse pixel, (d) comprises determining y as $Mean_{trimmed}$.

32. The method of claim 18, wherein if the component is a chroma component, (d) comprises omitting filtering if a difference between the noise level and a Trimmed SAD of a mask is greater than a constant, and determining a value of a pixel after filtering, y, as $\mu_{local}$ only if the difference is not greater than the constant.

33. The method of claim 32, wherein if the pixel after filtering is an impulse pixel, (d) comprises:
determining two reference pixels spatially away from a current chroma pixel by a transverse offset and another two reference pixels spatially away from the current chroma pixel by a longitudinal offset; and
determining a median for the four reference pixels and the current chroma pixel as y.

34. The method of claim 18, wherein the image sensor comprises one of a Charge Coupled Device (CCD) and a Complementary Metal Oxide Semiconductor (CMOS).

35. A computer-readable medium having stored thereon a computer program, wherein the program performs a method of reducing noise of an image sensor, the method comprising:
(a) estimating a noise level representing an image frame expressed as a component in a color space;
(b) detecting pixels corresponding to an impulse pixel, from among pixels constituting the image frame;
(c) determining filter strength based on the estimated noise level and on whether a current pixel is the impulse pixel; and
(d) filtering the pixels constituting the image frame according to the determined filter strength,
wherein the first impulse-detection unit determines if a difference between a current luma pixel value and a mean pixel value within a boundary block of a size is greater than an impulse threshold value $T_{impulse}$, counts a number of cases where a difference between the current luma pixel and an adjacent pixel within the boundary block is less than a threshold value $T_{var}$ if the difference between the current luma pixel value and the mean pixel value is greater than the impulse threshold value $T_{impulse}$, and then determines the current luma pixel as an impulse pixel if the number is less than a given number.

* * * * *